United States Patent
Krotsch et al.

(10) Patent No.: US 11,784,592 B2
(45) Date of Patent: Oct. 10, 2023

(54) CONTROL DEVICE AND METHOD FOR REDUCING THE COMMUTATION ANGLE ERROR OF AN EC MOTOR

(71) Applicant: ebm-papst Mulfingen GmbH & Co. KG, Mulfingen (DE)

(72) Inventors: Jens Krotsch, Niederstetten (DE); Thomas Ley, Weikersheim-Laudenbach (DE); Hiren Gondaliya, Baden-Baden (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 35 days.

(21) Appl. No.: 17/231,239

(22) Filed: Apr. 15, 2021

(65) Prior Publication Data

US 2021/0328529 A1    Oct. 21, 2021

(30) Foreign Application Priority Data

Apr. 16, 2020 (DE) ...................... 10 2020 110 419.7

(51) Int. Cl.
*G11B 19/28* (2006.01)
*H02P 6/15* (2016.01)
*H02P 6/16* (2016.01)

(52) U.S. Cl.
CPC ................ *H02P 6/153* (2016.02); *H02P 6/16* (2013.01)

(58) Field of Classification Search
CPC ... H02P 6/153; H02P 6/16; H02P 6/15; G11B 19/28
See application file for complete search history.

(56) References Cited

U.S. PATENT DOCUMENTS

| | | | | |
|---|---|---|---|---|
| 5,423,192 | A * | 6/1995 | Young | H02P 6/182 62/215 |
| 6,034,493 | A * | 3/2000 | Boyd | H02P 6/15 318/400.31 |
| 9,991,827 | B1 * | 6/2018 | Buckley | H02P 6/182 |
| 2004/0012355 | A1 * | 1/2004 | Sosseh | G11B 19/28 318/400.11 |
| 2017/0163182 | A1 * | 6/2017 | Fedigan | G01R 33/072 |

FOREIGN PATENT DOCUMENTS

| | | |
|---|---|---|
| DE | 4437793 A1 | 5/1996 |
| DE | 10213375 A1 | 10/2003 |
| DE | 102004062821 A1 | 7/2006 |
| DE | 102013221939 A1 | 4/2015 |
| EP | 2276162 A1 | 1/2011 |

OTHER PUBLICATIONS

German Search Report dated May 7, 2020 in corresponding German Application No. 102020110419.7.

* cited by examiner

*Primary Examiner* — Cortez M Cook
(74) *Attorney, Agent, or Firm* — Harness, Dickey & Pierce, P.L.C.

(57) ABSTRACT

A control device (1) is configured to reduce the commutation angle error $\varepsilon$ of a three-phase (u, v, w) EC motor (2.2) connected via a y-configuration. The three phases (u, v, w) are commutated via a motor control (3) including a rotor position sensor (4) and a control circuit (10). The rotor position sensor (4) senses the relative angular position of the rotor using the neutral-point potential at the neutral point of the y-configuration. The control circuit (10) is configured to impose a desired field weakening current component on the motor control (3) for reducing the commutation angle error $\varepsilon$.

14 Claims, 6 Drawing Sheets

CONTROL DEVICE AND METHOD FOR REDUCING THE COMMUTATION ANGLE ERROR OF AN EC MOTOR

CROSS-REFERENCE TO RELATED APPLICATION

This application claims priority to German Application No. 102020110419.7, filed Apr. 16, 2020. The disclosure of the above application is incorporating herein by reference.

FIELD

The disclosure relates to a control device and method for reducing the commutation angle error of an EC motor.

BACKGROUND

To control, for example, a permanent magnet synchronous motor (PMSM) in a field-oriented manner, the position of the rotor relative to the stator must be known. This is referred to as an angular position within a magnetic period of the motor or the so-called commutation angle. For controlling EC motors, it is well known to sense the rotor position using a position measuring device and calculate a commutation offset or commutation angle error for a given relative position between the actual rotor position and the rotor position sensed by the position measuring device. It is then used in controlling a power unit powering the motor, such as a commutation device in the form of a converter.

As such, the commutation angle error, also referred to as the commutation offset or electrical angle deviation, is the deviation of the actual rotational position of the rotor from the determined position or rotational position of the rotor.

An absolute position measuring device, where the rotor position is sensed immediately after activation of the EC motor, or an incremental position measuring system, where the absolute rotor position is determined only after one or more reference markers have been crossed, may be used to sense the rotor position.

Once the commutation offset, the phase displacement between the actual rotor position and the rotor position sensed by the position measuring device, is known, the commutation offset corrected measured rotor position can be used as a basis for controlling the synchronous motor. In this respect, a number of methods are known in the prior art that deal with the issue of sensing the commutation offset and the question of how to properly factor the offset into the commutation in the control device.

In the following description, the terms "rotor" and "stator" are merely intended to denote the function of basic elements of an electric motor. They either change their position relative to an external coordinate system (rotate or move)—the rotor—or are fixed relative to the external coordinate system—the stator. Particularly while starting the EC motor, it is desirable to know the exact position or angular position of the rotor relative to the associated stator. Thus, a suitable torque on the rotor may be generated. With known methods or devices, the angular position is obtained by measuring the absolute position via sensors, incrementally, or alternatively using the known prior art solutions for sensorless commutation.

Numerous additional methods are known in the prior art for detecting the commutation angle. In addition to the numerous methods determining the commutation angle by measuring electrotechnical parameters such as inductance or magnetic saturation there are also a variety of methods based on energizing the motor and detecting deviations of the rotor varying in size.

In DE 10213375 A1 a movement is imposed on a synchronous motor from the outside using field-oriented control, while a target current of zero is set for the control circuit. As such, the control circuit generates voltages that counteract the voltages induced in the motor by the movement. The phase angle of the voltages may be used to infer the commutation angle.

In DE 4437793 A1 a two-stage method for determining the phase angle of the rotor is described. Here, the phase angle is first roughly estimated and then fine-tuned. To achieve this, small deviations of the initially resting rotor caused by the application of current vectors are sensed and its phase angle is determined. Another way to detect the commutation angle is to apply a torque-building current to the synchronous motor in a freely chosen orientation. The rotor will then move and align itself parallel to the direction. Thus, its position and the commutation angle are detectable. In addition, a variety of methods for determining the commutation angle error are known in the prior art. For example, the commutation angle error may be determined using the neutral-point differential voltage.

However, knowing both the commutation angle and the commutation angle error will not eliminate the effect of the commutation angle error. The commutation angle error may result in instability of the motor operation. However, the aim of the prior art solutions is not avoiding the commutation angle error but instead correcting it using control engineering during motor control. The commutation angle error is caused by the phase displacement of the neutral-point differential voltage due to the field weakening current (d-current component).

The phase displacement of the neutral-point differential voltage refers to the phase displacement of the third harmonic component of the neutral-point differential voltage relative to the ground wave. This leads to the aforementioned commutation angle error. The phase displacement is the displacement between the ground wave of the magnet-wheel voltage and the current in a phase and/or the value of the arctangent function from the ratio of the field-building current (d-current) to the torque-building current (q-current).

In EC motors, where flow-building as well as torque-building current components cause a significant phase displacement in the neutral-point differential voltage and thus an error in the determination of the rotor's rotational position, the respective error occurs systemically unless countermeasures are taken. A positive phase displacement is undesirable as it is associated with a so-called positive feedback effect. Thus, an increasing angle error, in turn, leads to an increasing current and current angle which, in turn, leads to the further increase of the angle error and thus to motor failure. In the worst case, the positive feedback prevents the proper functioning of the EC motor.

Furthermore, many of the correction methods known in the prior art cannot be applied to EC motors with a current-dependent inductance.

As such, the object of the disclosure is not to reduce the impact of the commutation angle error but to generally avoid or significantly reduce a current or saturation-related commutation angle error.

SUMMARY

This object is achieved by a control device configured to reduce the commutation angle error $\varepsilon$ of a three-phase EC motor connected in a y-configuration. The three phases are commutated via a motor control, including a rotor position sensor for sensing the relative angular position of the rotor using the neutral-point potential at the neutral point of the y-configuration as well as a control circuit configured to impose a desired field weakening current component on the motor control to reduce the commutation angle error ε.

A basic concept of the present disclosure includes carrying out the rotor position sensing using the neutral point potential and imposing a desired field weakening current component (FCC) to the motor control system using a control device, specifically a control circuit.

The field weakening current component refers to the current component producing a magnetic field counteracting the magnetic field of the EC motor permanent magnet. Such a field weakening current component may be the field weakening current (negative d-current) or a corresponding phase displacement.

The core concept for reducing or preventing a systemic angle error comprises the imposition of a field weakening current component (FCC).

One characteristic of the field weakening current component is its dependence on operating parameters, such as current, duty cycle or torque, or a system parameter associated with an operating parameter, such as:
a) current (e.g., torque-building current component iq, total current I, intermediate circuit current Izk),
b) duty cycle A,
c) rotational speed n,
d) torque M, or
e) a combination thereof, such as a fan characteristic curve for an EC motor-driven fan.

Another aspect relates to the function definition of the field weakening current component (FCC) with respect to one of the operating parameters. The relationship between the field weakening current component and the torque may be defined as a constant, a linear function, a function with offset or a higher-order polynomial, to name a few examples. The definition may be freely chosen or determined by setting a max value and min value, which set the boundaries.

In yet another aspect, an appropriate range of values is selected. A suitable range of values for the field weakening current component is limited by permissible boundary values, such as an acceptable torque reduction caused by the field weakening current component FCC.

According to the disclosure, a control device is provided that is specifically configured to reduce the commutation angle error ε of a three-phase EC motor connected in a y-configuration. The three phases are commutated via a motor control. This includes a rotor position sensor for sensing the relative angular position of the rotor using the neutral-point potential at the neutral point of the y-configuration as well as a control circuit configured to impose a desired field weakening current component on the motor control for reducing the commutation angle error ε.

In another preferred embodiment of the disclosure, a signal processing unit is provided. It is configured to sense operational data of the EC motor related to the field weakening current component (FCC) in order to supply them to a controller of the motor control for the control task.

Another aspect of the present disclosure relates not only to the aforementioned device but also a method for reducing the commutation angle error of a three-phase EC motor connected in a y-configuration. The three phases are commutated via a motor control, preferably using a control device as defined above. A rotor position is sensed using the neutral-point potential at the neutral point of the y-configuration of the motor phases and imposing a field weakening current component (FCC) for reducing the commutation angle error of a commutation device for commutating the motor.

In a preferred embodiment of the method, a field weakening current component of a constant magnitude is provided. Alternatively, the field weakening current component may be a linear or non-linear function of an operating parameter of the EC motor, specifically a function of the torque M or the current of the EC motor. However, other operating parameters, such as duty cycle, rotational speed or the fan characteristic curve of the EC motor-driven fan are contemplated as well.

In another preferred embodiment of the method, the field weakening current component is sensed from the curve profile of the curve $$FCC=FCC(\varepsilon,Pi)$$

for a specific operating parameter Pi of the EC motor. First, the curve profile of the curve ε=ε (FCC) indicating the relationship between the angular deviation ε and the field weakening current component FCC is determined and based thereon a constant current component for the imposition is determined from the point of intersection of the curve FCC (ε, Pi) defining a maximum permissible angular deviation $\varepsilon_{max}$.

In another embodiment of the disclosure, the field weakening current component is determined from the curve profile of the respective function FCC=FCC(ε, Pi) of at least two or more curve profiles of the respective curve for each of different operating parameters, preferably for different torques of the EC motor. The functional relationship between the operating parameter and the field weakening current component is obtained. Prior to this the respective curve profile of the curve $$FCC=FCC(\varepsilon,Pi)$$

is determined for different values of a specific operating parameter (e.g., different torques) indicating the relationship between the angular deviation ε and the field weakening current component and, based thereon, a current component for the imposition is determined from respective points of intersection of the curves FCC(ε, Pi), each defining a predetermined permissible angular deviation $\varepsilon_{def}$. This can be done by linear approximation or averaging of the determined values of the points of intersection.

In an equally advantageous embodiment of the disclosure, the curve profile of the curve ε=ε(FFC) indicating the relationship between the angular deviation ε and the field weakening current component FCC is determined. This is on first determining that angular deviation $\varepsilon_{krit}$ in the profile where the EC motor can no longer be commutated in a certain rotationally stable operating state. This is determined by gradually increasing the permissible angular deviation until the rotationally stable operating state of the EC motor transitions to an unstable state defined by the curve point $\varepsilon_{krit}$ at the tangential contact point of a tangent T with the slope ST at the curve ε=ε(FCC). The tangent T is moved along the abscissa of the curve ε=ε(FCC) until the tangent T tangentially contacts a curve point of the curve ε(FCC) and the point of intersection between the tangent T and the abscissa determines the value of the field weakening current component.

Further advantageous developments of the disclosure are characterized in the dependent claims and are detailed below in conjunction with the description of the preferred embodiments with reference to the drawings.

DRAWINGS

Other advantageous embodiments of the disclosure are designated in the dependent claims and/or are described in further detail below along with the description of the preferred embodiment of the disclosure with reference to the figures. In the figures:

DETAILED DESCRIPTION

In the following, the disclosure is described in greater detail with reference to FIGS. 1 to 11. Identical reference numbers or labels are used in the figures to indicate identical structural and/or functional features or parameters, unless indicated otherwise.

Figure 1:
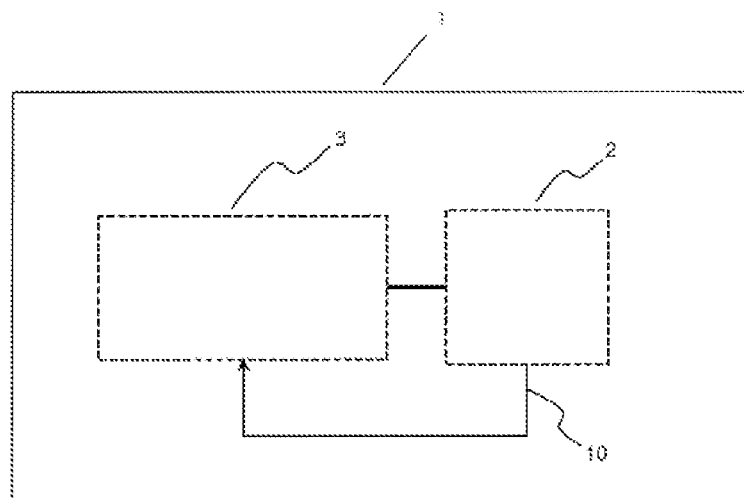
FIG. 1 is a schematic diagram of a control circuit.
Figure 11:
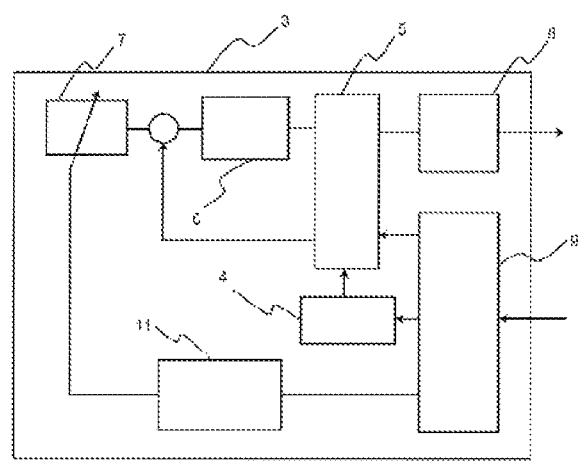
FIG. 11 is a schematic view of a motor control.

FIG. 1 shows a diagram of a control circuit 10 according to the concept of the present disclosure, wherein a control variable is controlled and supplied to the controller of the motor control 3. The motor control 3 controls the phase currents u, v, w of the EC motor (or a PMSM machine in general). An example topology of a motor control 3 is illustrated in FIG. 11. It comprises a rotor position sensor 4, a signal processing unit 5, the controller 6, a target value specification 7 (variable FCC input), a control unit 8, an obtaining unit 9 (measuring device with signal conditioning, an optional filter, offset correction, current sensor for current sensing, etc.), and the FCC calculating unit 11.

The obtaining unit 9 processes the motor data and forwards it to the controller 6. In this way, the imposition of the field weakening current component FCC for reducing the commutation angle error ε is achieved.

Figure 2:
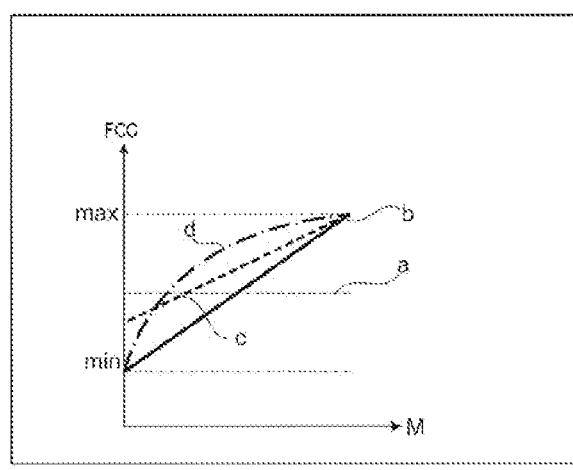
FIG. 2 is a graphic representation of the function definition.

FIG. 2 depicts a graphic representation of the function definition, illustrating the relationship between the field weakening current component FCC for reducing the commutation angle error ε and a specific operating parameter. As such, FIG. 2 demonstrates the functional relationship between the field weakening current component FCC and the torque M. The torque may be defined as a constant (curve a), a linear function (curve b), a function with an offset (curve c) or a polynomial function (curve d), specifically a higher-degree polynomial. As shown in this example, the determination may be carried out by specifying minimum and maximum values $FCC_{min}$, $FCC_{max}$.

Figure 3:
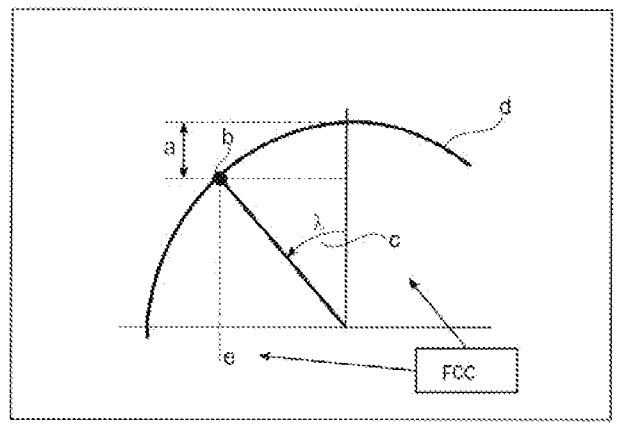
FIG. 3 is a graphic representation for determining the range of values.

FIG. 3 shows a graphic representation for setting the range of values of the FCC using the current, as an example, for the operating parameter.

Setting the max value comprises the following process:
1. acceptable torque reduction: Reference a (typically between 10% and 25%)
2. applying the line of equal intensity of current, e.g., the phase current amplitude, as, for example, the phase current, e.g., maximal permissible intensity of current: Reference d;
3. determining the point of intersection of the torque reduction and the current line of step 2: Reference b;
4. reading the maximal permissible field weakening current component FCC: Reference c or e.

The resulting typical max value for the phase displacement λ rounded up to 5° is between 30° and 45°.

The min value is set, for example, by determining the FCC where the motor operation becomes unstable (i.e. at the transition from a stable commutated state to an unstable state, where the controller fails). A typical value of λ is between −15° and 0°. Thus, the values of λ would range from −15° to 45° in the present example.

Figure 4:
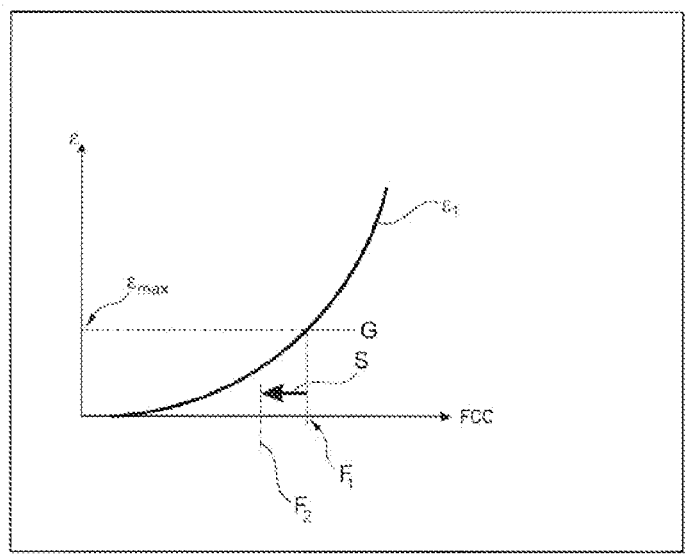
FIG. 4 is a graphic embodiment for determining or setting a specific constant value for the field weakening current component.

FIG. 4 shows an example embodiment for determining or setting a specific constant value for the field weakening current component. First, the angle error profile ε(FCC) is determined as a function of the FCC in the case of the largest deviation, in this case at maximum torque. $ε_1$(FCC) may be calculated using FEM or may be measured. Next, the maximum permissible angular deviation $ε_{max}$ is set (Reference G in FIG. 4). The value for FCC, in this case F1, is set based on the point of intersection of curves G and $ε_1$(FCC). In addition, it is contemplated to provide a safety margin S, such that the point of intersection with curve $ε_1$(FCC) yields a different value for FCC, indicated by Reference F2 in FIG. 4.

Figure 5:
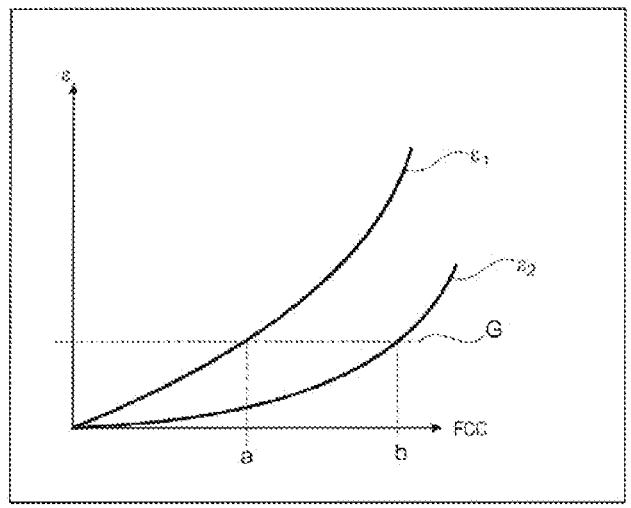
FIG. 5 is a graphic embodiment for determining or setting a value for the field weakening current component based on varying operating parameters (in this case the torque M).

FIG. 5 shows another example embodiment for determining or setting a value for the field weakening current component FCC based on a varying operating parameter (in this case: torque M at two different torque values). The process flow for determining the FCC as described above is repeated for each of the two torque values, thereby yielding points of intersection from the two curves ε(FCC) for curve $ε_1$ and curve $ε_2$. This results in two FCC values (References a and b in FIG. 5). The two FCC values are based on the respective selected torque. By means of, for example, linear interpolation a simple relationship between torque M and FCC is established.

The same process is used, for example, to establish the functional relationship between the current or a different operating parameter and the FCC.

Figure 6:
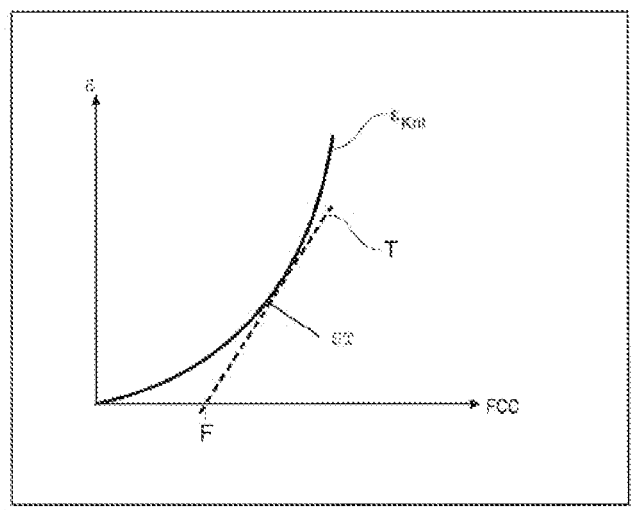
FIG. 6 is a graphic example embodiment for determining or setting a specific value for the field weakening current component at the transition to the unstable operating point of the EC motor.

FIG. 6 shows an example embodiment for determining or setting a specific value for the field weakening current component at the transition to the unstable operating point of the EC motor. First, the curve profile for the curve ε=ε(FCC) indicating the relationship between the angular deviation ε and the field weakening current component FCC is determined. Such an example curve is illustrated. Based thereon, the critical angular deviation $ε_{krit}$ is determined as follows from the profile where the EC motor can no longer be commutated in a specific rotationally stable operating state. The corresponding point $ε_{krit}$ is located at the tangential contact point of a tangent T with the slope ST (preferably ST<1.5) placed in tangential contact with the curve ε=ε(FCC). The tangent T is moved along the abscissa of the curve ε=ε(FCC) until the tangent T tangentially contacts the aforementioned critical curve point of curve ε(FCC). The point of intersection of tangent T and abscissa FCC yields the value with Reference F in FIG. 6 for the corresponding field weakening current component.

Figure 7:
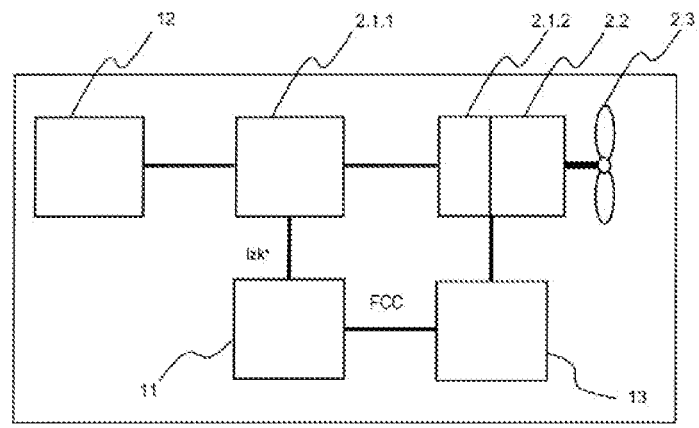
FIG. 7 is a schematic view of an example embodiment of an EC motor of a fan having a slow control.

FIG. 7 shows an example embodiment of an EC motor 2.2 of a fan having a slow controller 13. The example embodiment comprises a power supply 12, the converter 2.1 (inverter 2.1.1 and motor side converter 2.1.2) providing an intermediate circuit with measurement of the intermediate circuit current $I^*_{ZK}$. An EC motor 2.2 having an FCC-control 13 (with target value λ=FCC) is coupled thereto. The EC motor 2 drives a fan 2.3.

The FCC calculating unit, indicated by reference number 11, is used to determine the field weakening current component FCC and the boundary according to the following calculation scheme in the present example:

$$FCC=\lambda=k_1 *I^*_{ZK}+k_2 \text{ wherein } k_1=10°/0.8 \text{ and } k_2=3.75°$$

Figure 8:
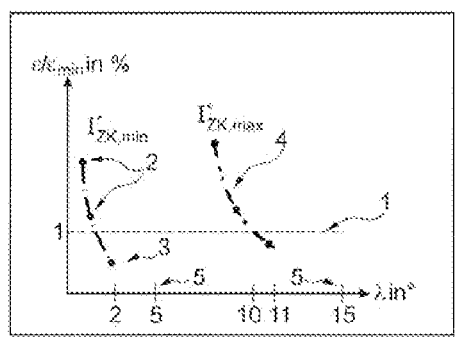
FIG. 8 is a graphic representation of the value determination in % as a function of phase displacement A.

Determining the values for the factors $k_1$ and $k_2$ for calculating FCC is explained with reference to FIGS. 8 to 10. In FIG. 8, determining the values for the error values $\varepsilon/\varepsilon_{max}$ in % is based on the phase displacement λ. The curve for $\varepsilon/\varepsilon_{max}=1$ is indicated by Reference 1 in FIG. 8, which thus defines the permissible margin of error. By incrementally or gradually changing λ the error values $\varepsilon/\varepsilon_{max}$ are first measured at the lowest load condition (see Reference 2 in FIG. 8). In this case, the value λ is determined to be below the set margin of error. In the present example embodiment this results in: $I^*_{ZK,min}$~0.1 corresponding to a phase angle of 2° (see Reference 3 in FIG. 8).

Next, the procedure is repeated at the highest load condition. In the present example embodiment this results in: $I^*_{ZK,max}$~0.9 corresponding to a phase angle of 11° (see Reference 4 in FIG. 8).

In a subsequent step, values are selected for 5° and 15°, respectively (see Reference 5 in FIG. 8).

Figure 9:
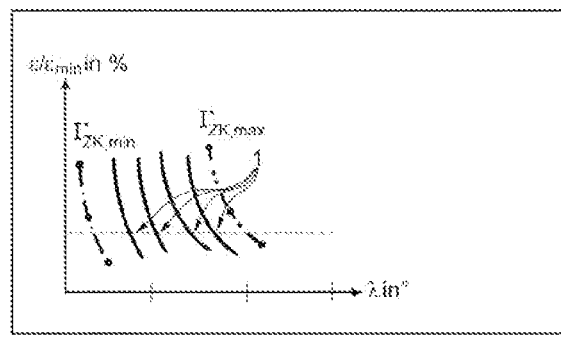
FIG. 9 is a graphic representation of the determination of intermediate values.
Figure 10:
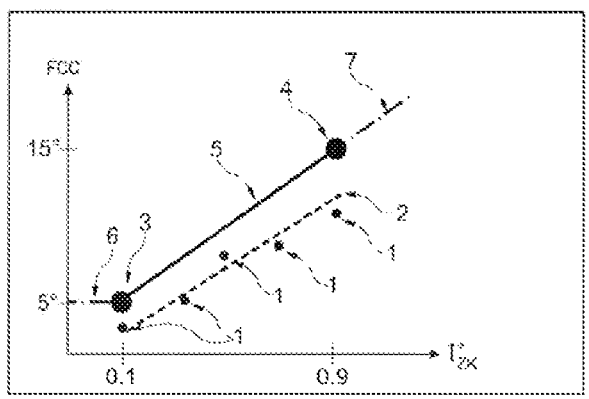
FIG. 10 is a graphic functional representation of the field weakening current component FCC as a function of the quotient of the intermediate circuit current and the nominal value of the intermediate circuit current.

In FIG. 9 a graphic representation for determining intermediate values is illustrated. FIG. 10 shows a functional representation of the field weakening current component FCC as a function of the quotient of the intermediate circuit current and the nominal value of the intermediate circuit current.

Next, the functional relationship with FCC must be established by measuring the intermediate values between $I^*_{ZK,min}$ and $I^*_{ZK,max}$, illustrated below with reference to FIG. 9 (see Reference 1 in FIG. 9).

Measuring the respective intermediate values follows the steps described in FIG. 8 for determining the min and max values (i.e. regarding References 1 to 4 in FIG. 8). In this example, the measured intermediate values show a substantially linear increase of the functional relationship between FCC and intermediate circuit current $I^*_{ZK}$, which will be apparent in FIG. 10 (see Reference 2 in FIG. 10).

Now, the values for 5° and 15° are copied from FIG. 8 (indicated by References 3 and 5 in FIG. 10), such that the slope and determined values yield the aforementioned functional relationship: $FCC=\lambda=(10°/0.8*I_{JC}+3.75°$.

Outside the measured range the smallest FCC value is set for lower current values and for higher current values the values for FCC are linearly extrapolated using the calculated function.

Implementation of the disclosure should not be limited by the preferred example embodiments described above. Rather, any number of variations utilizing the disclosed solution even in fundamentally different embodiments are contemplated.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A control device configured to reduce the commutation angle error ε of a three-phase EC motor connected in a y-configuration, the three phases being commutated via a motor control, including a rotor position sensor for sensing the relative angular position of the rotor using the neutral-point potential at the neutral point of the y-configuration as well as a control circuit configured to impose a desired field weakening current component on the motor control for reducing the commutation angle error ε, and a FCC calculating unit operably connected to a measurement obtaining unit and a target value specification for inputting a variable field weakening current component to impose a specific field weakening current component on the motor control for reducing the commutation angle error ε.

2. The control device of claim 1, further comprising a signal processing unit configured to collect operating data of the EC motor related to the field weakening current component and supply it to a controller of the motor control.

3. The control device of claim 1, wherein using the field weakening current (negative d-current) or a specific phase angle value as the field weakening current component.

4. The control device of claim 1, wherein using a current component that is connected based on operating parameters.

5. A method for reducing the commutation angle error ε of a three-phase EC motor connected via a y-configuration, the three phases being commutated via a motor control, comprising:
sensing a rotor position from the neutral-point potential at the neutral point of the y-configuration of the motor phases;
imposing a field weakening current component for reducing the commutation angle error ε of a commutation device for commutating the EC motor; and
providing a field weakening current component of constant magnitude.

6. The method of claim 5, wherein the field weakening current component is a linear or non-linear function of an operating parameter (Pi) of the EC motor, specifically a function of the torque M or the current of the EC motor.

7. The method of claim 5, further comprising sensing the field weakening current component from the curve profile of the curve FCC=FCC(ε, Pi) for a specific operating parameter (Pi), wherein first the curve profile ε=ε(FCC) indicating the relationship between the angular deviation s and the field weakening current component is determined and based thereon a constant current component for the imposition is determined from the point of intersection of curve FCC(ε, Pi) defining a maximum permissible angular deviation $\varepsilon_{max}$.

8. The method of claim 5, further comprising determining the field weakening current component from the curve profile of the respective function FCC(ε, Pi) of at least two or more curve profiles of each curve FCC(ε, Pi) for a respective different operating parameter (Pi), and based thereon obtaining the functional relationship between the operating parameter (Pi) and the field weakening current component, wherein prior to that the respective curve profile FCC(ε, Pi) indicating the relationship between the angular deviation ε and the field weakening current component is determined and based thereon a current component for the imposition is determined from the respective points of intersection of the curves FCC(ε, Pi) each defining a predetermined permissible angular deviation $\varepsilon_{def}$.

9. The method of claim 5, wherein the curve profile ε=ε(FCC) indicating the relationship between the angular deviation ε and the field weakening current component is determined and based thereon determining that angular deviation $\varepsilon_{krit}$ from the profile where the EC motor can no longer be commutated in a specific rotationally stable operating state is determined by gradually increasing the permissible angular deviation ε until the rotationally stable operating state of the EC motor transitions to an unstable state defined by the curve point $\varepsilon_{krit}$ at the tangential contact point of a tangent T with the slope ST at the curve ε=ε(FCC), the tangent T is moved along the abscissa FCC until the tangent T tangentially contacts a curve point of the curve ε(FCC) and the point of intersection between the tangent T and the abscissa determines the value for the field weakening current component.

10. A method for reducing the commutation angle error ε of a three-phase EC motor connected via a y-configuration, the three phases being commutated via a motor control, comprising:
sensing a rotor position from the neutral-point potential at the neutral point of the y-configuration of the motor phases; and
imposing a field weakening current component for reducing the commutation angle error ε of a commutation device for commutating the EC motor,
wherein the field weakening current component is a linear or non-linear function of an operating parameter (Pi) of the EC motor, specifically a function of the torque M or the current of the EC motor.

11. The method of claim 10 comprising sensing the field weakening current component from the curve profile of the curve FCC=FCC(ε, Pi) for a specific operating parameter (Pi), wherein first the curve profile ε=ε(FCC) indiates the relationship between the angular deviation ε and the field weakening current component is determined and based thereon a constant current component for the imposition is determined from the point of intersection of curve FCC(ε, Pi) defining a maximum permissible angular deviation $\varepsilon_{max}$.

12. The method of claim 10 comprising determining the field weakening current component from the curve profile of the respective function FCC(ε, Pi) of at least two or more curve profiles of each curve FCC(ε, Pi) for a respective different operating parameter (Pi), and based thereon obtaining the functional relationship between the operating parameter (Pi) and the field weakening current component, wherein prior to that the respective curve profile FCC(ε, Pi) indicating the relationship between the angular deviation ε and the field weakening current component is determined and based thereon a current component for the imposition is determined from the respective points of intersection of the curves FCC(ε, Pi) each defining a predetermined permissible angular deviation $\varepsilon_{def}$.

13. The method of claim 10 wherein the curve profile ε=ε(FCC) indicating the relationship between the angular deviation ε and the field weakening current component is determined and based thereon determining that angular deviation $\varepsilon_{krit}$ from the profile where the EC motor can no longer be commutated in a specific rotationally stable operating state is determined by gradually increasing the permissible angular deviation ε until the rotationally stable operating state of the EC motor transitions to an unstable state defined by the curve point $\varepsilon_{krit}$ at the tangential contact point of a tangent T with the slope ST at the curve ε=ε(FCC), the tangent T is moved along the abscissa FCC until the tangent T tangentially contacts a curve point of the curve ε(FCC) and the point of intersection between the tangent T and the abscissa determines the value for the field weakening current component.

14. The control device of claim 4, wherein operating parameters include at least one of current, duty cycle or torque of the motor for the imposition of a field weakening current component.

* * * * *

UNITED STATES PATENT AND TRADEMARK OFFICE
CERTIFICATE OF CORRECTION

PATENT NO. : 11,784,592 B2
APPLICATION NO. : 17/231239
DATED : October 10, 2023
INVENTOR(S) : Jens Krotsch et al.

Page 1 of 1

It is certified that error appears in the above-identified patent and that said Letters Patent is hereby corrected as shown below:

In the Claims

Column 8, Line 56, Claim 7 delete "s" and insert --ε--

Signed and Sealed this
Second Day of January, 2024

Katherine Kelly Vidal
*Director of the United States Patent and Trademark Office*